US006830613B2

(12) United States Patent
Mihara et al.

(10) Patent No.: US 6,830,613 B2
(45) Date of Patent: Dec. 14, 2004

(54) METHOD OF MANUFACTURING A SUGAR-INORGANIC HYBRID COMPOSITE

(75) Inventors: Chieko Mihara, Isehara (JP); Toyoko Kobayashi, Yokohama (JP); Hiroyoshi Kishi, Atsugi (JP); Toshihiko Takeda, Atsugi (JP); Yoshihiko Kikuchi, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 10/746,079

(22) Filed: Dec. 24, 2003

(65) Prior Publication Data

US 2004/0134384 A1 Jul. 15, 2004

Related U.S. Application Data

(63) Continuation of application No. 09/824,047, filed on Apr. 3, 2001.

(51) Int. Cl.[7] .............................. C08J 7/12; C08L 1/10; C08L 1/12; C08L 1/14; C08L 1/16; C08L 1/18; C08L 1/30; C08L 5/00; C08L 5/08

(52) U.S. Cl. ................................ 106/217.9; 106/162.2; 106/169.55; 106/169.56; 106/170.57; 106/170.58; 106/197.01; 106/198.1; 106/204.01; 106/204.2; 106/204.3; 127/36; 127/37; 264/340

(58) Field of Search ....................... 106/170.57, 170.58, 106/169.55, 169.56, 162.2, 197.01, 198.1, 204.01, 204.2, 204.3; 127/36, 37; 264/340

(56) References Cited

U.S. PATENT DOCUMENTS

| | | | | | |
|---|---|---|---|---|---|
| 3,210,208 | A | | 10/1965 | Grass, Jr. et al. | 106/153.1 |
| 3,252,818 | A | * | 5/1966 | Cooper et al. | 106/217.9 |
| 3,644,245 | A | | 2/1972 | Flanagan et al. | 524/262 |
| 4,328,136 | A | | 5/1982 | Blount | 523/204 |
| 4,428,776 | A | * | 1/1984 | Li | 106/122 |
| 5,223,652 | A | * | 6/1993 | Ishida et al. | 84/427 |
| 5,227,470 | A | | 7/1993 | Kanno et al. | 530/359 |
| 5,720,804 | A | | 2/1998 | Martin | 106/170.2 |

FOREIGN PATENT DOCUMENTS

| | | |
|---|---|---|
| JP | 5-310431 | 11/1993 |
| JP | 7-309972 | 11/1995 |

* cited by examiner

*Primary Examiner*—David Brunsman
(74) *Attorney, Agent, or Firm*—Fitzpatrick, Cella, Harper and Scinto

(57) ABSTRACT

A biodegradable sugar-inorganic hybrid composite comprising a sugar or a sugar derivative uniformly dispersed in a matrix of an inorganic oxide, of which degradation products are suitable for recycling use.

6 Claims, 5 Drawing Sheets

METHOD OF MANUFACTURING A SUGAR-INORGANIC HYBRID COMPOSITE

This application is a continuation of application Ser. No. 09/824,047, filed Apr. 3, 2001.

BACKGROUND OF THE INVENTION

1. Field of the Invention

The present invention relates to novel, homogeneous sugar-inorganic hybrid composites made from sugar and inorganic substance. Specifically, the invention relates to a sugar-inorganic hybrid composite suitable for recycling utilization, that is, the composite has biodegradability and the degraded product thereof can be used again as a raw-material for sugar-inorganic hybrid production.

2. Related Background Art

Recently, the global environmental pollution has become conspicuous, and environmental consideration is required for not only industrial wastes but also domestic wastes. Plastic resins used as industrial materials are no exception, and research and development are actively carried out to obtain new materials to lessen environmental burden.

On the other hand, certain decomposition products obtained by decomposing resin into lower molecules by thermal decomposition or chemical decomposition may be reused as a raw material for the resin production. For example, polystyrene is decomposed into styrene monomers and dimers by catalytic cracking using a solid catalyst to supply a raw material for polystyrene production. Also polypropylene may be extracted as oil by catalytic cracking.

However, since ordinary resin composites including above-mentioned resins are utilized in wide areas in many ways as various products or parts, it is impossible to recover all of them and collection and sorting of them costs much. Even with collected resins, those not sortable must be disposed by landfill or incineration as wastes.

Incineration will trigger global warming by carbon dioxide discharge, or environmental pollution by toxic gas discharge. On the other hand, most of resin composites will remain intact underground for a long time by landfill.

From such a background, necessity for biodegradable plastics has been growing.

Biodegradable plastic composites are roughly classified into three, i.e., microbial products, natural products of plant origin, and synthetic compounds.

In particular, natural products of plant origin are useful, since the source itself is harmless and biodegradable. Useful natural products include collagen, gelatin, starch, cellulose, and chitosan which can be used as a single material. Further, there are modified natural products such as mixture of starch and modified polyvinyl alcohol, chemically modified cellulose such as cellulose esters, composites of cellulose and chitosan, but the part strength, especially water resistance, is not sufficient when natural products are merely mixed or compounded.

Thus, there are several attempts to make organic-inorganic hybrids maintaining good biodegradability of natural sugars and providing sufficient part strength. As one attempt to use sugar as the organic material, for example, Japanese Patent Application Laid-Open No. 7-309972 discloses a biodegradable moldable composite that comprises a polysaccharide, a metal compound that can bind chemically with hydroxyl groups of the sugar, and a solvent. This method, however, has a problem that the sugar content is low since most of the sugars used therein are water-soluble polysaccharides having poor compatibility with the metal compounds. Japanese Patent Application Laid-Open No. 5-310431 discloses a method to disperse a sugar derivative having urethane bonds, urea bonds, or amide bonds in an inorganic oxide matrix in order to increase the sugar content in the complex. This method, however, needs to synthesize such sugar derivatives having certain bonds by reacting sugar with isopropyl isocyanate etc.

Under such circumstances, future resin composites are strongly required to have excellent biodegradability as well as strength and cost performance comparable with resin composites of general purpose. Usually biodegradable resin composites (Japanese Patent Application Laid-Open No. 5-287043) are disposed by landfill, and seldom recycled. However, it is very important to actively decompose resin and use the decomposition product efficiently. As described above, the degradation product is resins are reused but many degradation products cannot be reused and utilization rate is low. Thus development of resin composites enabling more effective reutilization of decomposition product is expected.

SUMMARY OF THE INVENTION

An object of the present invention is to provide sugar-inorganic material composites which can be easily decomposed to give decomposition products polymerable again and of which biodegradability is excellent when disposed by landfill because of the higher sugar content than the conventional resins.

According to the present invention, there is provided a sugar-inorganic hybrid composite wherein a sugar or sugar derivative is evenly dispersed in an inorganic oxide matrix.

The sugar or sugar derivative is preferably a polysaccharide or derivatives thereof soluble in an organic solvent.

The sugar or sugar derivative is preferably cellulose, a cellulose derivative, or chitosan.

The cellulose derivative is preferably a cellulose ester.

The cellulose ester is preferably selected from the group consisting of cellulose acetate, cellulose acetate butyrate, cellulose propionate, benzyl cellulose, cellulose sulfate, or cellulose nitrate.

The inorganic oxide matrix is preferably one or more matrixes selected from the group consisting of silica gel, titanium oxide, aluminum oxides and magnesium oxide.

The novel sugar-inorganic hybrid composite of the invention is a uniform and transparent material made of a sugar and an inorganic substance. This novel sugar-inorganic hybrid composite has biodegradability and gives degradation products which can be used again as raw materials for producing sugar-inorganic hybrid composite.

In addition, the hybrid composites of the invention can be provided at a low cost, since cheap raw materials can be used for production.

DETAILED DESCRIPTION OF THE INVENTION

Figure 1:
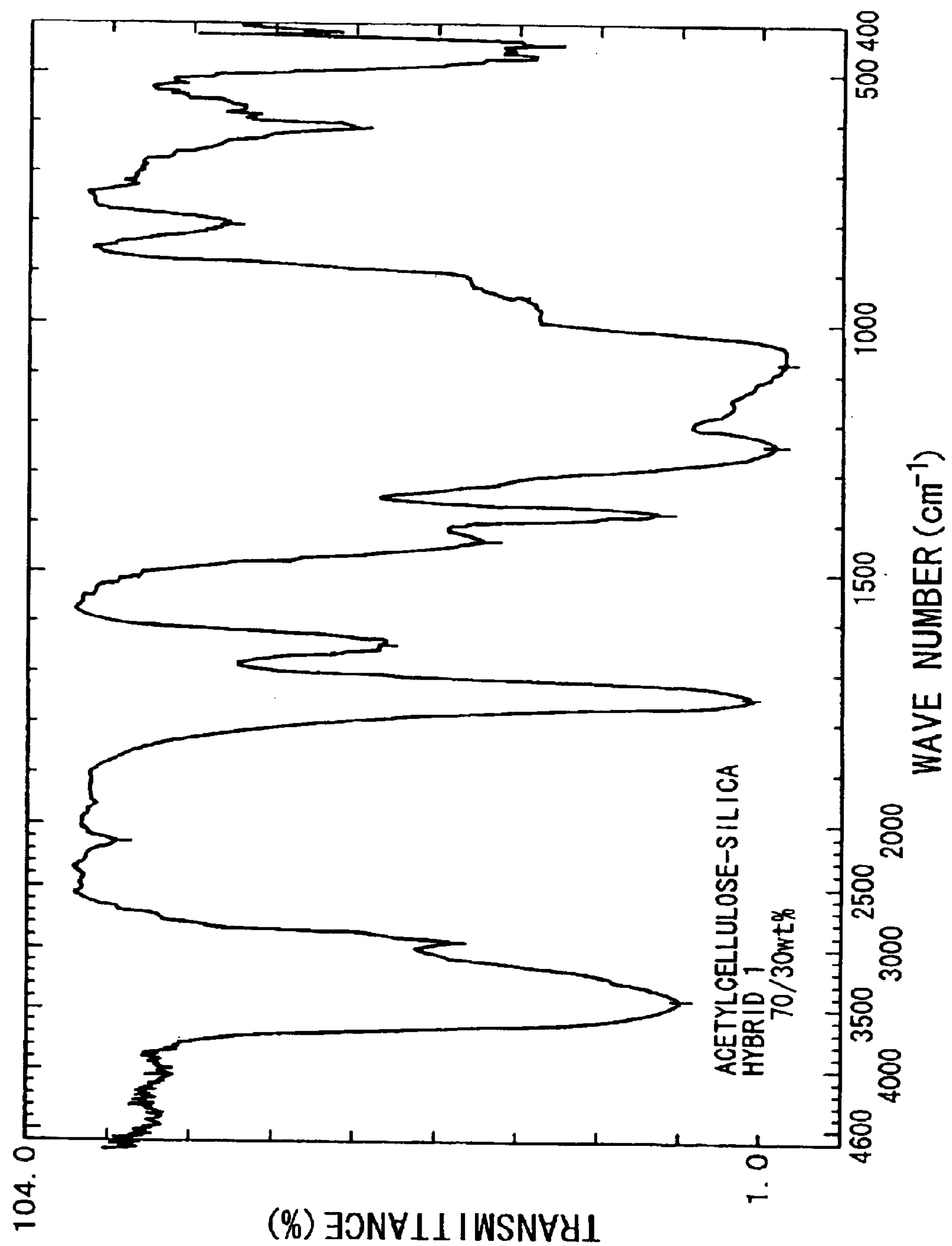
FIG. 1 is an infrared spectrum of acetylcellulose-silica hybrid 1 of Example 1.

The invention is now described in detail.

The present invention relates to uniform transparent sugar-inorganic hybrid composites made from sugar and organic substance, specifically to biodegradable sugar-inorganic hybrid composites of recycling type, characterized by the reusability of the degradation products as raw materials for producing sugar-inorganic hybrid composites.

According to the present invention, a sugar derivative such as cellulose ester is uniformly dispersed in the matrix of an inorganic oxide such as silica gel to form an organic-inorganic hybrid resin composite.

Sugar or sugar derivatives include polysaccharides or derivatives thereof, soluble in an organic solvent, for example, cellulose, cellulose esters, chitosan, and chitosan esters. Cellulose esters include cellulose acetate, cellulose acetate butyrate, cellulose propionate, benzyl cellulose, cellulose sulfate, and cellulose nitrate. In view of solubility in organic solvents, the ester substitution ratio is preferably 30% or more, more preferably, 40% or more.

Cellulose acetate is especially preferable in view of time and cost, since cellulose acetate of various substitution and polymerization rates are industrially manufactured saving synthesis of sugar derivatives.

Organic solvents to dissolve the polysaccharide and the inorganic oxide include tetrahydrofuran (THF), dioxane, oxalic acid, N,N-dimethylformamide (DMF), dimethylsulfoxide (DMSO), alcohols such as methanol, ethanol, propanol and butanol, ethylene glycol, ethylene oxide, triethanolamine, xylene, and N,N-dimethylacetoamide.

Acids usable as a catalyst include hydrochloric acid, sulfuric acid, nitric acid, acetic acid, and hydrofluoric acid. Alkalis usable as a catalyst include ammonia.

As the inorganic oxide to form a matrix, various oxides can be used in accordance with the purpose or use. Generally,.silica or alumina is used.

The inorganic oxide is processed by the sol-gel process to form a fine porous structure, in which the above-mentioned sugar derivative is dispersed uniformly. In addition to silica and alumina, metal oxides such as titania and zirconia can be used as the inorganic oxide.

The formulation ratio of inorganic oxide to sugar derivative, for example, a hydrolysis-polymerizable silane compound to a sugar derivative in case of sugar-silica composites, is usually about 0.1 to 100 parts by weight to 1 part of sugar derivative, preferably, about 1–10.

The sugar-inorganic hybrid composite may contain additives such as aerosil and fillers.

The method for producing the sugar-inorganic hybrid composite of the present invention is not specifically limited but usually employed is the sol-gel process, where a hydrolysis-polymerizable compound is subjected to gelation in the presence of a sugar or sugar derivative to obtain a hybrid composite containing the sugar dispersed uniformly therein. Hydrolysis-polymerizable compounds include alkoxysilane such as tetraethoxysilane, tetramethoxysilane and tetrabutoxysilane; aluminum alkoxide such as aluminum butoxide and aluminum propoxide; and vanadium ethoxide.

The hydrolysis-polymerization in this method can be carried out by the same operation conditions as the conventional sol-gel process. For example, a sugar derivative and tetraalkoxysilane are dissolved with an organic solvent as described above, e.g., THF or methanol, and to thus obtained uniform solution, an acid catalyst such as hydrochloric acid is added dropwise with stirring for reaction. The reaction temperature may be room temperature or chosen in the range of 0–50° C. Reaction time may be from 30 minutes to 24 hours with relation to the reaction temperature. For example, when reaction is carried out at room temperature, the reaction time is preferably from about 30 minutes to 2 hours. Alternatively, reaction may be carried out under nitrogen stream or argon stream, or under a reduced pressure of about 0.5 to 1 atm.

In the above described method, sugar derivatives having ester bonds are especially useful, since they have such excellent compatibility and affinity with tetraalkoxysilane that phase separation will not occur before and after the gelation of hydrolysis-polymerization of tetraalkoxysilane, and the sugar derivatives can be dispersed in the three dimensional fine network structure of silica gel, to give uniform and transparent sugar-inorganic hybrids.

These transparent sugar-inorganic hybrids can take any form such as film, sphere and fiber, by keeping them in such a certain form before or after the gelation. They can be used as transparent organic-inorganic glass.

Sugar derivatives used in the sugar-inorganic hybrid composite of the invention have an ester bond known as a hydrogen bonding acceptor. During hybrid formation, strong interaction through hydrogen bonding between the carbonyl groups (—C═O) of ester bond and the hydroxyl groups of inorganic oxide, e.g., silanol groups (—SiOH) of silica gel, prevents the sugar molecules from aggregating with each other. Thus, phase separation between sugar and inorganic oxide will not occur.

Meanwhile, formed hybrids can be hydrolyzed with enzyme catalysts or acid or alkali catalysts, and the degradation product can be used again.

Further in the present invention, the hybrid can be biodegraded by microorganisms that produce such degradation enzymes.

The present invention is explained in detail with the following Examples, but these Examples are not to limit the scope of the present invention.

EXAMPLES

Example 1

Production of Acetylcellulose-Silica Hybrid 1

In 100 g of THF, 20 g of acetylcellulose (a product of Aldrich, acetylation degree: 39.8 wt %, Mn: ca. 30000) was added, to which 16 g of tetramethoxysilane was added to obtain a uniform solution. To this solution, 5 g of 0.1 M hydrochloric acid was added dropwise, and the solution was stirred for 1 hour at room temperature for hydrolysis to obtain acetylcellulose-silica hybrid 1. The weight ratio of acetylcellulose to silica of this hybrid was 70/30.

The obtained solution was spread over a polypropylene board by wire bar coating, and the board was dried for 15 minutes at room temperature under argon stream and then left and dried in the ambient conditions. A transparent film of 90 $\mu$m thick was thus obtained.

FIG. 1 shows an infrared spectrum of acetylcellulose-silica hybrid 1, where increase of a peak at about 1130 cm$^{-1}$ shows formation of siloxane bonds (—Si—O—).

Figure 2:
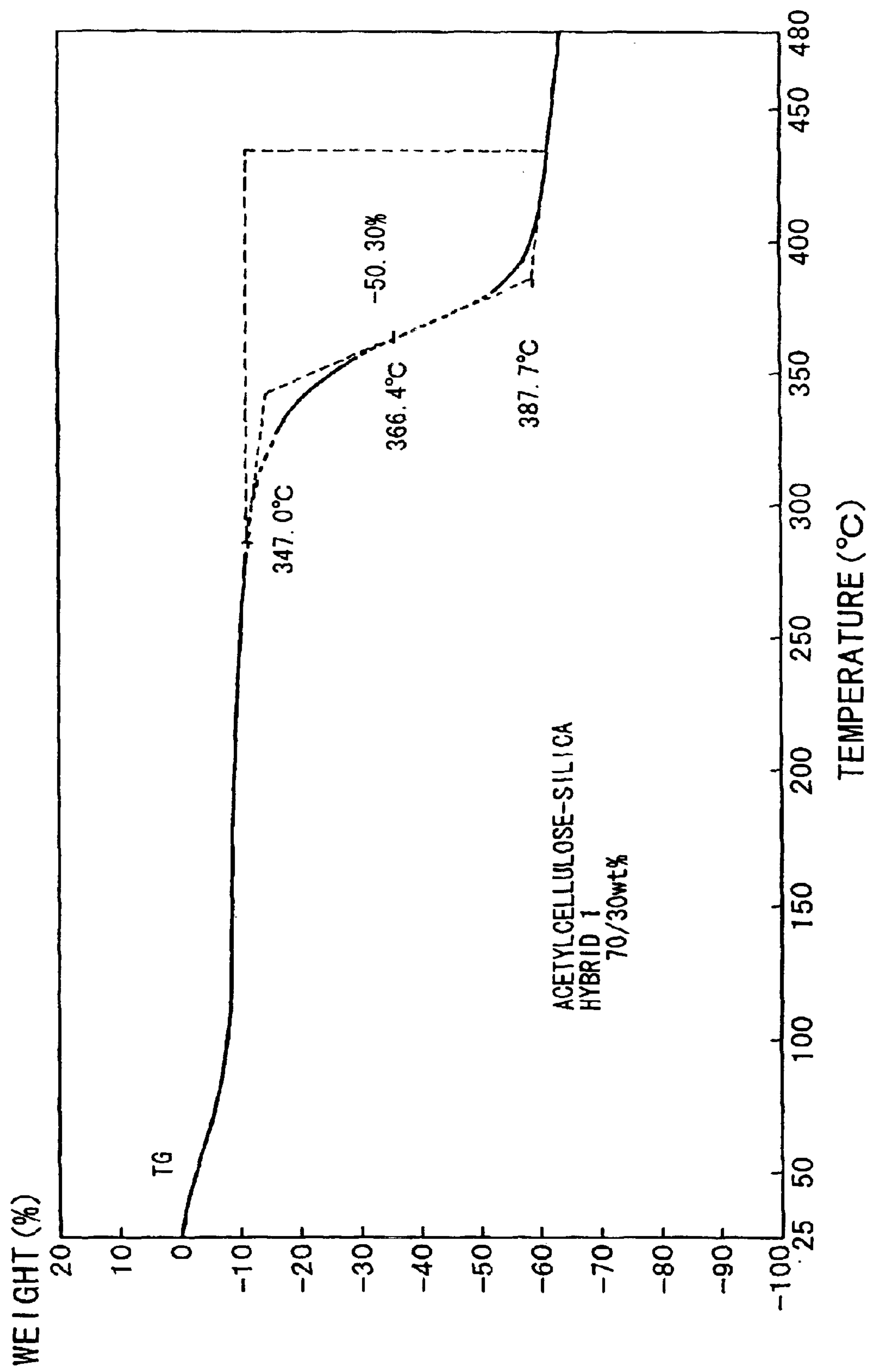
FIG. 2 is a thermogram of acetylcellulose-silica hybrid 1 of Example 1.

FIG. 2 is a thermogram of acetylcellulose-silica hybrid 1. As shown in FIG. 2, the decomposition starting temperature was 347° C. by thermogravimetry.

Example 2

Production of Acetylcellulose-Silica Hybrid 2

In 50 g of THF, 5 g of acetylcellulose (a product of Aldrich, acetylation degree 39.8 wt %, Mn: ca.30000) was dissolved, to which 17.3 g of tetraethoxysilane was added to obtain a uniform solution. To this solution, 2.5 g of 0.1 M hydrochloric acid was added dropwise, and the solution was stirred for 1 hour at room temperature for hydrolysis to obtain acetylcellulose-silica hybrid. The weight ratio of acetylcellulose to silica of this hybrid was 50/50.

The obtained solution was spread over a polypropylene board by wire bar coating, and dried for 20 minutes at room temperature under argon stream and then left and dried in the ambient conditions. A transparent film of 50 $\mu$m thick was thus obtained.

Figure 3:
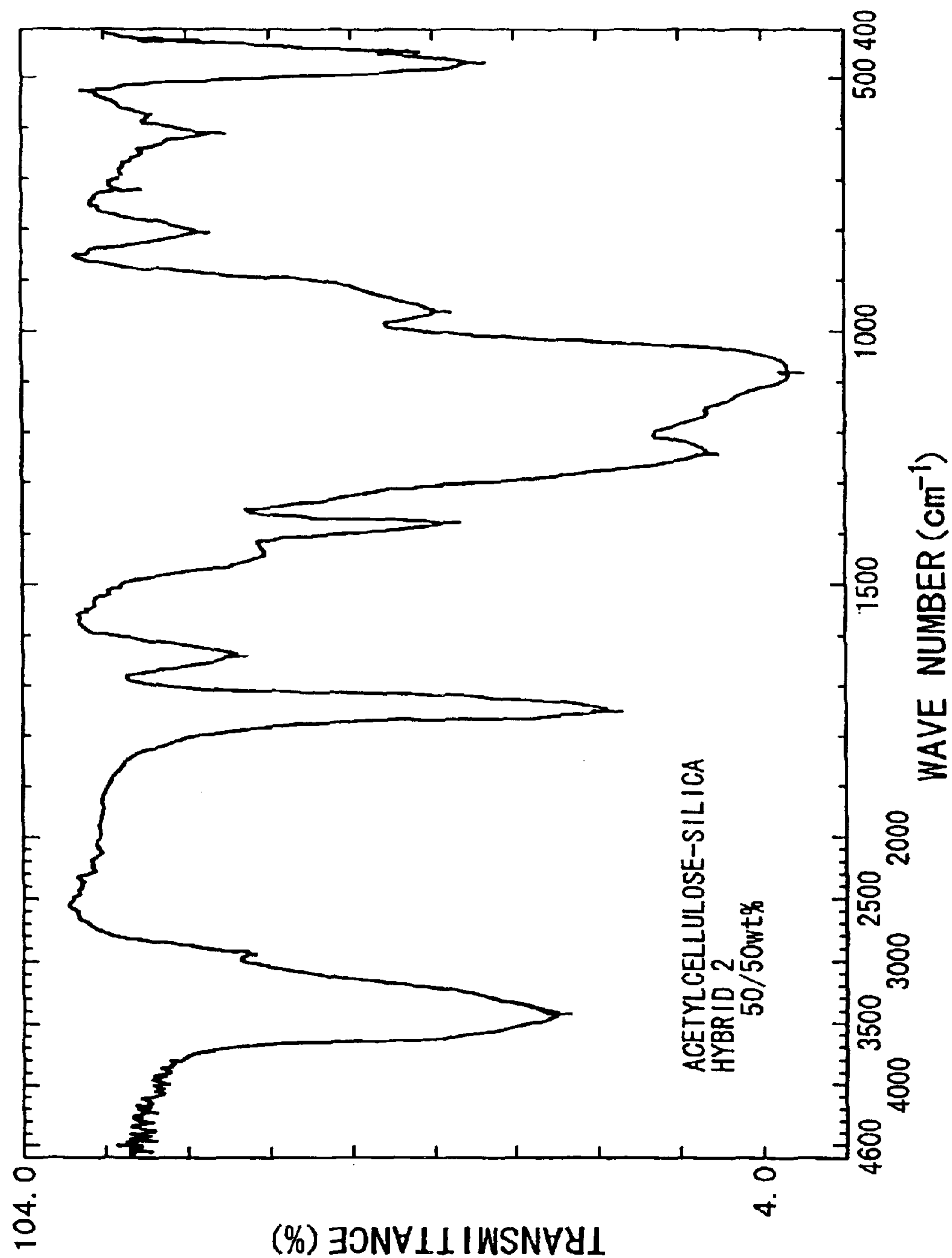
FIG. 3 is an infrared spectrum of acetylcellulose-silica hybrid 1 of Example 2.

FIG. 3 shows an infrared spectrum of acetylcellulose-silica hybrid 2, where increase of a peak at about 1130 $cm^{-1}$ shows formation of siloxane bonds (—Si—O—).

Figure 4:
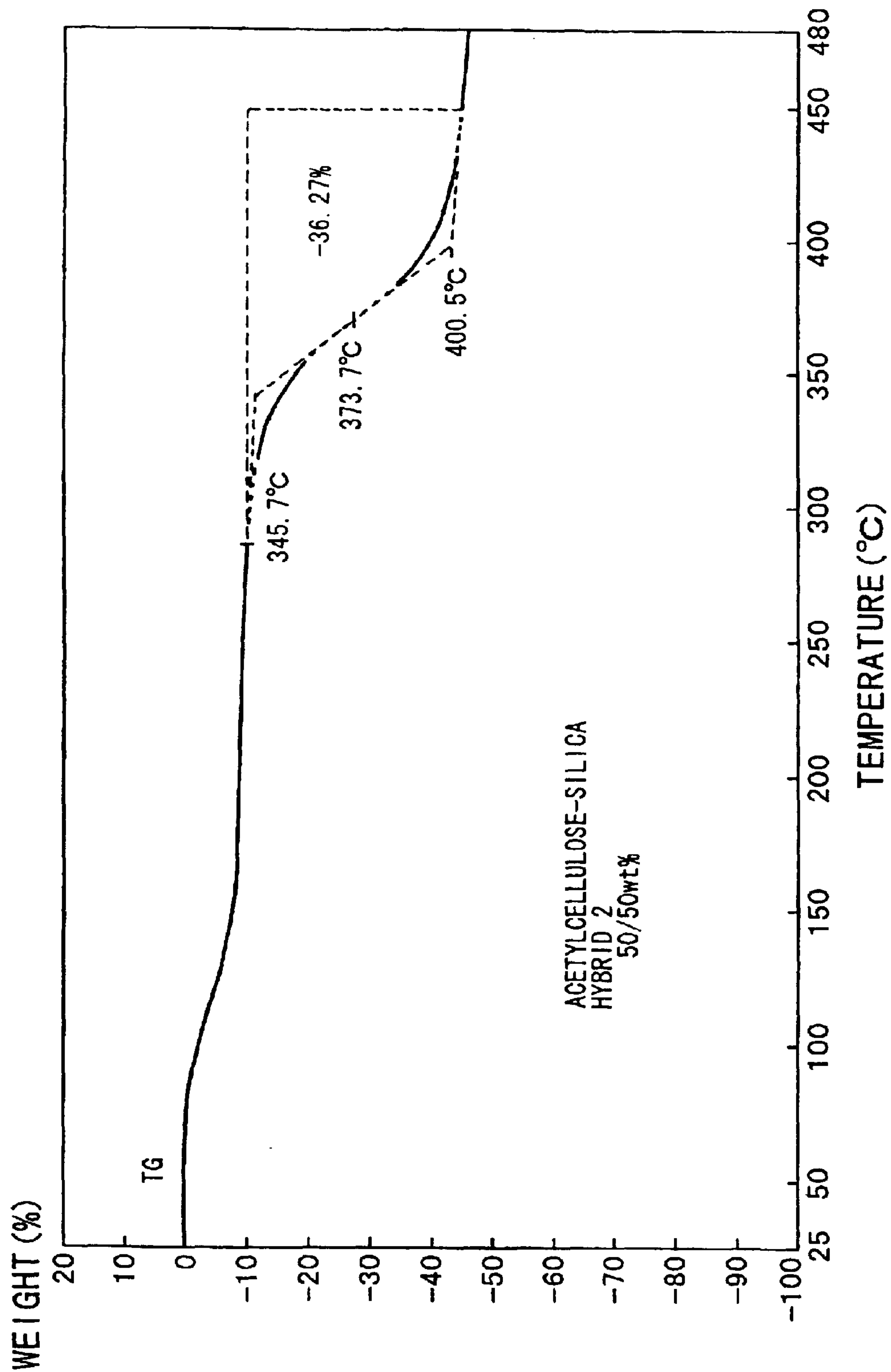
FIG. 4 is a thermogram of acetylcellulose-silica hybrid 1 of Example 2.

FIG. 4 is a thermogram of silica-silica hybrid 2. As shown in FIG. 4, the decomposition starting temperature was 346° C. by thermogravimetry.

Example 3

Production of Acetylcellulose-Silica Hybrid 3

In 60 g of THF, 8.5 g of cellulose propionate (a product of Aldrich, propionation degree of 42.5 wt %, Mn=15000) was added, to which a solution of 2.5 g of Aerosil 300 (a product of Japan Aerosil) in 25 g of THF was added to obtain a uniform solution. To this solution, 2.5 g of 0.1 M hydrochloric acid was added dropwise, and the solution was stirred for 1 day at room temperature to obtain cellulose propionate-silica(aerosil) hybrid 3. The weight ratio of cellulose propionate to silica of this hybrid was 90/10.

The obtained solution was spread over a polypropylene board by wire bar coating, and dried for 15 minutes at room temperature under argon stream and then left and dried in the ambient conditions. A transparent film of 90 $\mu$m thick was thus obtained.

Figure 5:
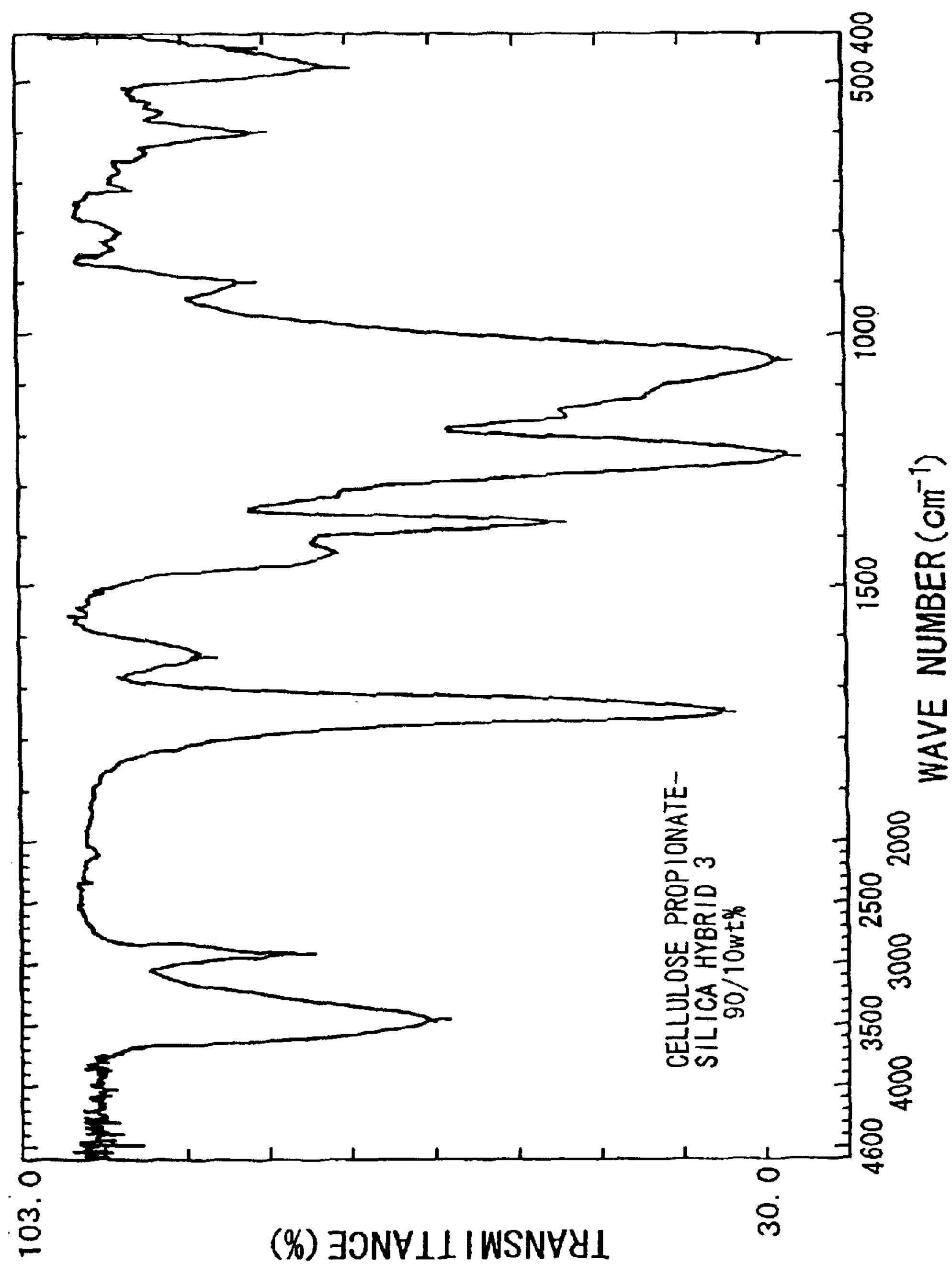
FIG. 5 is an infrared spectrum of cellulose propionate—silica hybrid 3 of Example 3.

FIG. 5 shows an infrared spectrum of cellulose propionate-silica hybrid 3, where increase of a peak at about 1130 $cm^{-1}$ shows formation of siloxane bonds.

The decomposition starting temperature was 349° C. by thermogravimetry.

Example 4

Preparation of Chitosan-Silica Hybrid

Into 100 g of DMF, 10 g of low molecular weight chitosan M (a product of Seikagaku Corporation, Mn 400 to 20000) was dissolved, to which 15 g of tetramethoxysilane was added to obtain a uniformly solution. To this solution, 5 g of 0.1 M hydrochloric acid was added dropwise, and the solution was stirred for 2 hr at room temperature for hydrolysis to obtain chitosan-silica hybrid having siloxane bonding. The weight ratio of chitosan to silica of this hybrid was 90/10.

The obtained solution was spread over a polyethylene terephthalate board by using a Baker applicator, and dried for 15 minutes at room temperature under argon stream and then left and dried in the ambient conditions. A film 90 $\mu$m thick was thus obtained.

Increase of a peak at about 1130 $cm^{-1}$ confirmed the formation of siloxane bonds (—Si—O—).

The decomposition starting temperature of the hybrid was 345° C. by thermogravimetry.

Example 5

Preparation of Acetylcellulose-Alumina Hybrid

Into 80 g of methanol, 20 g of acetylcellulose (a product of Aldrich, acetylation degree:39.8 wt %, Mn: ca.30000) was dissolved, to which 21.5 g of aluminum isopropoxide was dissolved to obtain a uniformly solution. To this solution, 4 g of 0.05 M sulfuric acid was added dropwise, and the solution was stirred for 1 hour at room temperature for hydrolysis to obtain acetylcellulose-silica hybrid. The weight ratio of acetylcellulose to silica of this hybrid was 70/30.

The obtained solution was spread over a polyethylene polypropylene board by using a Baker applicator, and dried for 15 minutes at room temperature under nitrogen stream and then left and dried in the ambient conditions. A film of 100 $\mu$m thickness was thus obtained.

Increase of a peak at around 1130 $cm^{-1}$ confirmed the formation of bonds of —Al—O—.

The decomposition starting temperature of the hybrid was 342° C. by thermogravimetry.

Comparative Example 1

Preparation of Pullulan-Silica Hybrid

To 100 g of THF, 20 g of pullulan (a product of Seikagaku Corporataion) was dissolved, to which 16 g of tetramethoxysilane was added and stirred, but no uniform solution was obtained. To this solution, 5 g of 0.1 M hydrochloric acid was added dropwise and stirred for 1 hour at room temperature.

This solution was applied onto a polypropylene board by wire bar coating in the same manner as in Example 1, and dried under argon stream for 15 min followed by air drying. No film was formed because of uniformity of the solution.

Example 6

Biodegradation of Acetylcellulose-Silica Hybrid 1

Biodegradability of the hybrid composite obtained in Example 1 was examined by the aerobic biodegradation test in compost (DIS14855). After 45 day incubation in a mature compost, at a temperature of 58±2° C., biodegradation degree was 70% according to the carbon dioxide generation amount.

Example 7

Alkali Degradation of Acetylcellulose-Silica Hybrid 2

Thirty milligrams of acetylcellulose-silica hybrid obtained in Example 2 was reacted in a dilute solution of sodium hydroxide for 3 hours at 0° C. After the reaction, the solution was washed with THF to remove acetylcellulose and $SiO_2$. The residual white powder was subjected to gel permeation chromatography, and cellulose having weight average molecular weight of 23000 was obtained.

Infrared spectrum of the degradation product shows only absorption of cellulose with no absorption at 1720 $cm^{-1}$ (acetyl group) and at 1130 $cm^{-1}$ (siloxane bond).

This cellulose can be used again as a raw material for hybrid preparation, for example, by reacting it in a solution of acetic anhydride and pyridine at 0° C.

What is claimed is:

1. A method for manufacturing a sugar-inorganic hybrid composite comprising the steps of:

preparing a sugar-inorganic hybrid composite comprising a sugar or a derivative thereof uniformly dispersed in a matrix of an inorganic oxide;

hydrolyzing the composite into a degradation product; and using the degradation product to manufacture a sugar-inorganic hybrid composite.

2. The manufacturing method according to claim 1, wherein the sugar or the sugar derivative is a polysaccharide or a derivative thereof soluble in an organic acid.

3. The manufacturing method according to claim 2, wherein the polysaccharide is cellulose, a cellulose derivative or chitosan.

4. The manufacturing method according to claim 3, wherein the cellulose derivative is a cellulose ester.

5. The manufacturing method according to claim 4, wherein the cellulose is selected from the group consisting of cellulose acetate, cellulose acetate butyrate, cellulose propionate, benzyl cellulose, cellulose sulfate and cellulose nitrate.

6. The manufacturing method according to claim 1, wherein the matrix is of at least one inorganic oxide selected from the group consisting of silica gel, titanium oxide, aluminum oxide and magnesium oxide.

* * * * *